US010802711B2

(12) United States Patent
Clement et al.

(10) Patent No.: US 10,802,711 B2
(45) Date of Patent: Oct. 13, 2020

(54) VOLUMETRIC VIRTUAL REALITY KEYBOARD METHODS, USER INTERFACE, AND INTERACTIONS

(71) Applicant: Google Inc., Mountain View, CA (US)

(72) Inventors: Manuel Christian Clement, Felton, CA (US); Andrey Doronichev, San Francisco, CA (US); Stefan Welker, Mountain View, CA (US)

(73) Assignee: Google LLC, Mountain View, CA (US)

(*) Notice: Subject to any disclaimer, the term of this patent is extended or adjusted under 35 U.S.C. 154(b) by 257 days.

(21) Appl. No.: 15/591,394

(22) Filed: May 10, 2017

(65) Prior Publication Data
US 2017/0329515 A1 Nov. 16, 2017

Related U.S. Application Data

(60) Provisional application No. 62/334,034, filed on May 10, 2016.

(51) Int. Cl.
G06F 3/0488 (2013.01)
G06F 3/0481 (2013.01)
(Continued)

(52) U.S. Cl.
CPC .......... G06F 3/04886 (2013.01); G06F 3/011 (2013.01); G06F 3/0346 (2013.01); G06F 3/04815 (2013.01)

(58) Field of Classification Search
CPC .... G06T 19/006; G06F 3/04886; G06F 3/011; G06F 3/0346; G06F 3/04815
(Continued)

(56) References Cited

U.S. PATENT DOCUMENTS 4,980,519 A 12/1990 Mathews
5,513,129 A 4/1996 Bolas et al.
(Continued)

FOREIGN PATENT DOCUMENTS

EP 2286932 A2 2/2011
EP 2945045 A1 11/2015
(Continued)

OTHER PUBLICATIONS

Notice of Allowance for U.S. Appl. No. 15/151,169, dated Aug. 16, 2017, 12 pages.
(Continued)

Primary Examiner — Sherief Badawi
Assistant Examiner — Koorosh Nehchiri
(74) Attorney, Agent, or Firm — Brake Hughes Bellermann LLP

(57) ABSTRACT

Systems and methods are described that include generating a virtual environment for display in a head-mounted display device. The virtual environment may include at least one three-dimensional virtual object having a plurality of volumetric zones configured to receive virtual contact. The method may also include detecting a plurality of inputs corresponding to a plurality of actions performed in the virtual environment on the at least one three-dimensional virtual object. Each action corresponds to a plurality of positions and orientations associated with at least one tracked input device. The method may include generating, for each action and while detecting the plurality of inputs, a plurality of prediction models and determining based on the plurality of prediction models in which of the plurality of volumetric zones the at least one tracked input device is predicted to virtually collide.

20 Claims, 9 Drawing Sheets

(51) Int. Cl.
*G06F 3/0346* (2013.01)
*G06F 3/01* (2006.01)
(58) Field of Classification Search
USPC ........................................................ 715/773
See application file for complete search history.

(56) References Cited

U.S. PATENT DOCUMENTS

| | | | |
|---|---|---|---|
| 5,835,077 A | 11/1998 | Dao et al. | |
| 6,066,794 A | 5/2000 | Longo | |
| 6,148,280 A | 11/2000 | Kramer et al. | |
| 6,150,600 A | 11/2000 | Buchla | |
| 6,256,044 B1 | 7/2001 | Carraro et al. | |
| 6,388,183 B1 | 5/2002 | Leh et al. | |
| 6,844,871 B1 * | 1/2005 | Hinckley | G06F 3/0317 345/163 |
| 7,379,562 B2 | 5/2008 | Wilson et al. | |
| 7,939,742 B2 | 5/2011 | Glaser et al. | |
| 7,973,232 B2 | 7/2011 | Lengeling | |
| 8,009,022 B2 | 8/2011 | Kipman et al. | |
| 8,164,567 B1 | 4/2012 | Barney et al. | |
| 8,586,853 B2 | 11/2013 | Sakazaki et al. | |
| 8,759,659 B2 | 6/2014 | Tabata | |
| 8,830,162 B2 | 9/2014 | Helmer et al. | |
| 8,858,330 B2 | 10/2014 | Ahmed et al. | |
| 9,154,870 B2 | 10/2015 | Watanabe | |
| 9,171,531 B2 | 10/2015 | David | |
| 9,480,929 B2 | 11/2016 | Weston et al. | |
| 9,542,919 B1 | 1/2017 | Bencar et al. | |
| 9,666,173 B2 | 5/2017 | Lee et al. | |
| 9,847,079 B2 | 12/2017 | Clement et al. | |
| 9,928,655 B1 | 3/2018 | Alston | |
| 10,139,899 B1 | 11/2018 | Niemeyer et al. | |
| 2002/0021287 A1 | 2/2002 | Tomasi et al. | |
| 2002/0102024 A1 | 8/2002 | Jones et al. | |
| 2003/0058339 A1 | 3/2003 | Trajkovic et al. | |
| 2003/0100965 A1 | 5/2003 | Sitrick et al. | |
| 2006/0098827 A1 | 5/2006 | Paddock et al. | |
| 2007/0256551 A1 | 11/2007 | Knapp et al. | |
| 2008/0122786 A1 * | 5/2008 | Pryor | A63F 13/02 345/156 |
| 2009/0077504 A1 * | 3/2009 | Bell | G06F 3/011 715/863 |
| 2009/0114079 A1 | 5/2009 | Egan et al. | |
| 2010/0138680 A1 | 6/2010 | Brisebois et al. | |
| 2010/0150359 A1 | 6/2010 | Knickrehm et al. | |
| 2010/0177035 A1 * | 7/2010 | Schowengerdt | G06F 1/163 345/156 |
| 2010/0322472 A1 | 12/2010 | Hamalainen et al. | |
| 2011/0227919 A1 | 9/2011 | Bongio et al. | |
| 2011/0234490 A1 * | 9/2011 | Markovic | G06F 3/017 345/156 |
| 2011/0300522 A1 | 12/2011 | Faubert et al. | |
| 2011/0316793 A1 | 12/2011 | Fushiki | |
| 2012/0236031 A1 * | 9/2012 | Haddick | G02B 27/0093 345/633 |
| 2013/0044128 A1 | 2/2013 | Liu et al. | |
| 2013/0047823 A1 | 2/2013 | Tabata et al. | |
| 2013/0222329 A1 * | 8/2013 | Larsby | G06F 3/04883 345/174 |
| 2014/0083279 A1 | 3/2014 | Little et al. | |
| 2014/0204002 A1 * | 7/2014 | Bennet | G06F 3/011 345/8 |
| 2014/0365878 A1 | 12/2014 | Dai et al. | |
| 2015/0134572 A1 | 5/2015 | Forlines et al. | |
| 2015/0143976 A1 * | 5/2015 | Katto | A63F 13/211 84/602 |
| 2015/0212581 A1 * | 7/2015 | Kawalkar | G06F 3/017 701/3 |
| 2015/0287395 A1 * | 10/2015 | Rapp | G10H 3/125 84/422.1 |
| 2015/0317910 A1 | 11/2015 | Daniels | |
| 2015/0331659 A1 | 11/2015 | Park | |
| 2015/0358543 A1 | 12/2015 | Kord | |
| 2016/0018985 A1 * | 1/2016 | Bennet | G06F 3/04886 345/175 |
| 2016/0092021 A1 | 3/2016 | Tu et al. | |
| 2016/0196813 A1 * | 7/2016 | Hardi | G10H 1/0008 84/600 |
| 2016/0225188 A1 | 8/2016 | Haverstock et al. | |
| 2016/0364015 A1 | 12/2016 | Irle et al. | |
| 2017/0003750 A1 | 1/2017 | Li et al. | |
| 2017/0003764 A1 | 1/2017 | Li | |
| 2017/0004648 A1 | 1/2017 | Li | |
| 2017/0018121 A1 | 1/2017 | Lawson et al. | |
| 2017/0038830 A1 | 2/2017 | Clement et al. | |
| 2017/0047056 A1 | 2/2017 | Lee et al. | |
| 2017/0212589 A1 | 7/2017 | Domenikos et al. | |
| 2017/0329515 A1 | 11/2017 | Clement et al. | |
| 2018/0004305 A1 | 1/2018 | Moseley et al. | |

FOREIGN PATENT DOCUMENTS

| | | |
|---|---|---|
| WO | 2017/196404 A1 | 11/2017 |
| WO | 2017/196928 A1 | 11/2017 |

OTHER PUBLICATIONS

International Search Report and Written Opinion for PCT Application No. PCT/US2017/031887, dated Jun. 29, 2017, 14 pages.
"Aerodrums Intros Virtual Reality Drum Set for Oculus Rift", 2016 NAMM Show, retrieved from http://www.synthtopia.com/content/2016/01/22/aerodrums-intros-virtual-reality-drum-set-for-oculus-rift/, Jan. 22, 2016, 2 pages.
"Virtual Drums: A 3D Drum Set", retrieved on Nov. 24, 2015 from http://www.virtualdrums.com, Nov. 24, 2015, 2 pages.
Berthaut, et al., "Piivert: Percussion-based Interaction for Immersive Virtual EnviRonmenTs", Mar. 20-21, 2010, 5 pages.
Hutchings, "Interact With a Screen Using Your Hand, Paintbrush or Drumstick", http://www.psfk.com/2015/08/pressuresensitiveinputdevicesenselmorph.html#run, Aug. 26, 2015, 5 pages.
Maeki-Patola, et al, "Experiments with Virtual Reality Instruments", Proceedings of the 2005 International Conference on New Interfaces for Musical Expression (NIME05), May 26-28, 2005, 6 pages.
International Search Report and Written Opinion for PCT Application No. PCT/US2016/068544, dated Apr. 12, 2017, 10 pages.

* cited by examiner

VOLUMETRIC VIRTUAL REALITY KEYBOARD METHODS, USER INTERFACE, AND INTERACTIONS

CROSS-REFERENCE TO RELATED APPLICATIONS

This application claims priority to, and is a continuation of, U.S. Provisional Patent Application No. 62/334,034, filed on May 10, 2016, entitled "VOLUMETRIC VIRTUAL REALITY KEYBOARD METHODS, USER INTERFACE, AND INTERACTIONS", the disclosure of which is incorporated by reference herein in its entirety.

TECHNICAL FIELD

This description generally relates to input methods and devices in virtual reality (VR) environments.

BACKGROUND

Many virtual reality environments accept user input from a wide range of input devices. For example, any combination of mobile devices, keyboards, controllers, and tracked hand movements can be used to provide input to a virtual reality (VR) space. Providing input in the VR space can also entail a combination of motions and device manipulations. Each motion and device manipulation can be performed by a user accessing the VR space.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a computer-implemented method that includes generating a virtual environment for display in a head-mounted display device. The virtual environment may include at least one three-dimensional virtual object having a plurality of volumetric zones configured to receive virtual contact. The method may also include detecting, with a processor, a plurality of inputs corresponding to a plurality of actions performed in the virtual environment on the at least one three-dimensional virtual object. Each action may correspond to a plurality of positions and orientations associated with at least one tracked input device. The method may also include generating, with the processor, and for each action and while detecting the plurality of inputs, a plurality of prediction models. The plurality of prediction models may determine in which of the plurality of volumetric zones, the at least one tracked input device is predicted to virtually collide. The method may also include for each action, matching, with the processor, at least one prediction model from the plurality of prediction models to a trajectory corresponding to a virtual collision with at least one of the plurality of volumetric zones. The method may further include in response to matching the at least one prediction model, performing the action associated with the at least one prediction model, and providing output in a display of the head-mounted display device. The output may include a textual character corresponding to the virtual collision in the at least one of the plurality of volumetric zones. Other embodiments of this aspect include corresponding computer systems, apparatus, and computer programs recorded on one or more computer storage devices, each configured to perform the actions of the methods.

Implementations may include one or more of the following features. The method where determining which of the plurality of volumetric zones a portion of the at least one tracked input device contacts is based at least in part on the plurality of positions and orientations associated with the at least one tracked input device and a derived velocity for the at least one tracked input device. The method where the plurality of prediction models process six dimensions of spacial data for a determined course of travel corresponding to the tracked input device and one or more of the plurality of volumetric zones. The method where generating the plurality of prediction models includes processing the plurality of inputs that include, for each action, a heading, an angle, a course, and a derived velocity. The method where the course includes a trajectory and a collision zone corresponding to at least one of the plurality of volumetric zones. The method further including in response to determining a match does not exist between the at least one prediction model and the trajectory, suppressing performance of the action associated with the at least one prediction model. In some implementations, the method includes generating, with the processor, and for each action and while detecting the plurality of inputs, a plurality of prediction models and determining based on the plurality of prediction models in which of the plurality of volumetric zones the at least one tracked input device is predicted to virtually collide. The method further including suppressing performance of the action associated with the at least one prediction model based on determining that a force of a velocity associated with the action is below a threshold velocity. The method where the plurality of prediction models filter one or more of the plurality of actions to determine which of the plurality of actions corresponds to entering text on a virtual keyboard associated with the at least one three-dimensional virtual object. The method where the virtual environment includes at least one configurable text entry device and the input corresponds to entries performed on the configurable text entry device. The method where the configurable text entry device includes an electronic virtual keyboard ergonomically adaptable to a user accessing the virtual environment. The method where the plurality of actions are tracked in six degrees of freedom to determine a position and orientation associated with each action performed within the virtual environment. The method where the at least one tracked input device is a set of two virtual reality controllers depicted in the virtual environment as a set of two drumsticks. The method where the at least one tracked input device is a virtual object held by a hand of a user accessing the virtual environment. Implementations of the described techniques may include hardware, a method or process, or computer software on a computer-accessible medium.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
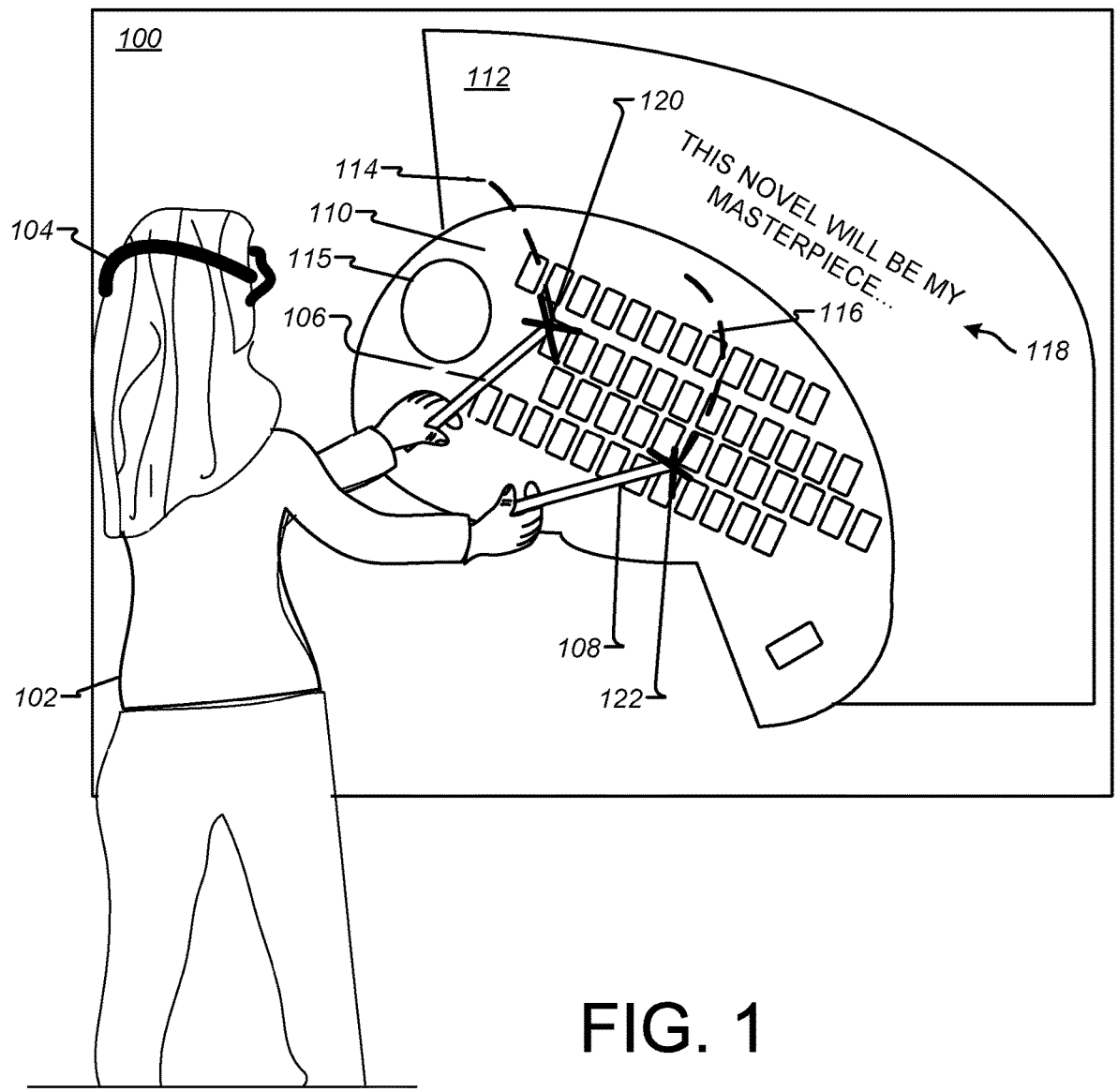
FIG. 1 illustrates a user accessing a virtual reality (VR) space to perform interactive tasks.

The systems and methods described herein can receive user input in a VR space and from such input can detect particular headings, trajectories, and velocities for movements associated with the user input. In some implementations, the systems and methods can determine (e.g., predict) which motions a user intends to carry out in the VR space. For example, a user can input text on a virtual keyboard object using arcing movements associated with virtual drumsticks, mallets, controllers, or other virtual object or physical object tracked in the VR space.

In some implementations, the arcing (e.g., swinging) movements may include measurable speed and/or trajectories that can be used to predict a time of impact with a particular virtual object. The speed and/or trajectories can also be used to predict a location of impact on the virtual object. Such predictions can enable text entries on a keyboard virtual object to occur before virtual impact with the keyboard virtual object occurs in real time. This can provide an advantage of improved speed of text entries and early error correction of the text entries.

The movements can be performed by a user holding physical devices including, for example, drumsticks, controllers, mobile devices, or other object(s) configurable to select keys on a virtual keyboard). The movements can provide input to trigger tracking and prediction tasks to be carried out by the systems described herein. In some implementations, the tracking and prediction tasks can be used to determine which key or keys on the virtual keyboard object that the user intends to select (or collide with) using a tracked object (e.g., drumstick, controller, mobile device, sword, or other device configurable to select keys on a virtual keyboard). In some implementations, the tracked object may be a virtual object and the user may use physical hands (tracked in the VR space by sensors) to simulate movements of a virtual object that can be used to select portions of the virtual object (e.g., keys on a virtual keyboard).

In general, the systems and methods described in this disclosure can include movement tracking and prediction mechanisms to predict contact locations (e.g., collision zones) between two or more objects in a VR space. For example, a contact may occur upon a drumstick movement being tracked into a zone (defined in virtual space) that houses the virtual keyboard. The contact (i.e., collision) may occur as the drumstick selects the key. However, the movements can be analyzed before contact to determine which key or keys the user intends to collide with. In some implementations, the movements carried out by the user may pertain to user-generated input translated into the VR space.

In some implementations, a predicted collision can be based upon a context associated with the user. For example, if the user entering text on a virtual keyboard with, for example, drumsticks is in a text messaging application, the systems described herein can use automatic corrections associated with the user's typical text messaging habits. If instead, the user were to be entering text in a business email account, different dictionaries, automatic completion text, and automatic correction text may be employed.

In some implementations, a predicted collision can be based upon a context associated with the environment. For example, if the user is entering text while engaged in several applications in the VR space, the systems described herein may use an eye gaze position and/or head position to determine which application the user is targeting (e.g., intending) to enter text. The systems can then enter or not enter text into particular applications according to the context of eye or head position.

In operation, two or more objects that can be tracked to determine (e.g., predict) where and/or when a contact (e.g., collision) may occur between the objects. In some implementations, the two or more objects can include two controllers used as input devices and a virtual keyboard object to receive input from the two controllers. In some implementations, the objects can include a tracked arm (e.g., hand) and a virtual object that the arm can touch (e.g., collide into). In some implementations, the objects can include a mobile device, a drumstick or selection device, and/or a menu object. In some implementations, the objects can include legs (e.g., feet) and virtual objects placed in the VR space to receive input from foot movements.

The prediction of contact zones can provide an advantage of allowing users to comfortably enter text in unconventional ways. For example, the movement tracking and prediction mechanisms described herein can enable a user to input text on a virtual keyboard object using virtual drumsticks to select keys on a virtual keyboard object. The prediction mechanisms can be used to suppress particular contact with virtual objects or portions of such objects (e.g., keys on the keyboard) to provide a user experience of text entry that enables fast and accurate text and word formation, in response to user-based hand, arm, or finger motions. The suppression of particular contact can provide an advantage of allowing the user to enter data content without accidentally entering typos or menu selections outside of an intended collision point associated with a tracked object (e.g., hand, finger, controller, drumstick, etc.).

In addition, the tracking, translating, and suppression of particular movements can provide an advantage of normalizing text entry movements to provide textual output that is accurate for a user. The input may be provided via controller or hand movements that interact with unconventional text entry into one or more virtual devices. Examples of objects associated with unconventional text entry may include a keyboard shown as a musical instrument or a menu displayed in a stacked or fanned manner in the VR space.

In some implementations, a user may enter text using motion to input the text into an ergonomically modified virtual keyboard or other virtual object fashioned in a way to enter text, numbers, or symbols in the VR space. An ergonomically modified keyboard can be crafted onto a virtual object, representing a keyboard that allows for ergonomic interaction with the keyboard via controllers, hands, or extensions of such controllers or hands (e.g., drumsticks, mallets, sticks, etc.). In other examples, particular menus, text entry areas or other input areas can be generated in the VR space to provide virtual keypads, number pads, or other selectable virtual objects capable of providing user-selectable letters, numbers, or symbols for entering text into applications in the VR space.

FIG. 1 illustrates a user accessing a virtual reality (VR) space to perform interactive tasks. The example implementation shown in FIG. 1 will be described with respect to a user 102 wearing an HMD device 104 that substantially blocks out the ambient environment, so that the HMD device 104 generates a virtual environment/VR space, with the user's field of view confined to the VR space generated by the HMD device 104. However, the concepts and features described below with respect to FIG. 1 may also be applied to other types of HMD devices, and other types of virtual reality environments and augmented reality environments. In addition, the examples shown in FIG. 1 include a user illustrated as a third-person view of the user 102 wearing the HMD device 104 and holding the controllers/mallets/drumsticks 106 and 108. The view 100 illustrates a first person view of what may be viewed by the user 102 in the VR space generated by the HMD device 104 and the systems described herein. Such views are more explicitly illustrated in FIGS. 3A-3C.

In the example shown in FIG. 1, the user 102 wearing the HMD device 104 is facing into a room defining a VR space in view 100. The HMD device 104 may capture images and/or collect information defining features in the VR space. The images and information collected by the HMD device 104 (or by one or more tracked hands, drumsticks, or controllers (e.g., drumsticks 106 and/or 108) may then be processed by the HMD device 104 to render and display a 3D model of the VR space and any number of models of virtual objects. In general, drumsticks 106 and 108 may be controlled by controllers, hands, arms, eye movements, or other trackable input.

In the depicted example, the view 100 includes a keyboard 110 that the user has manipulated to be more ergonomic for text entry and user comfort and a screen 112 that has also been modified according to user preferences. The keyboard 110 includes a modified spacebar 115 and a number of letters, symbols, and number keys that have been adjusted to receive drumstick or mallet-like input. The user 102 is shown swinging devices 106 and 108 in respective paths/trajectories 114 and 116 and in response, keys are selected in the VR space, which can be translated to generate output text 118 (i.e., "THIS NOVEL WILL BE MY MASTERPIECE . . . "). The devices 106 and 108 each have a definable tip (e.g., 120, 122) that may be used to collide with the keyboard 110. In some implementations, trajectories of the tip may be detected. In some implementations, the trajectories of the tip of a virtual object, for example, may be detected and/or determined using mathematical prediction models to verify the detected locations of the moving tip. In some implementations, the mathematical prediction model may include determining a probability of the impact of the tip on a particular key on the keyboard. The probability can be calculated as a level (e.g., a percentage) and can be provided as an indicator as to which key (e.g., location) may be impacted by the tip. In some implementations, the probability may pertain to a time at which the tip will impact a particular key.

Figure 2:
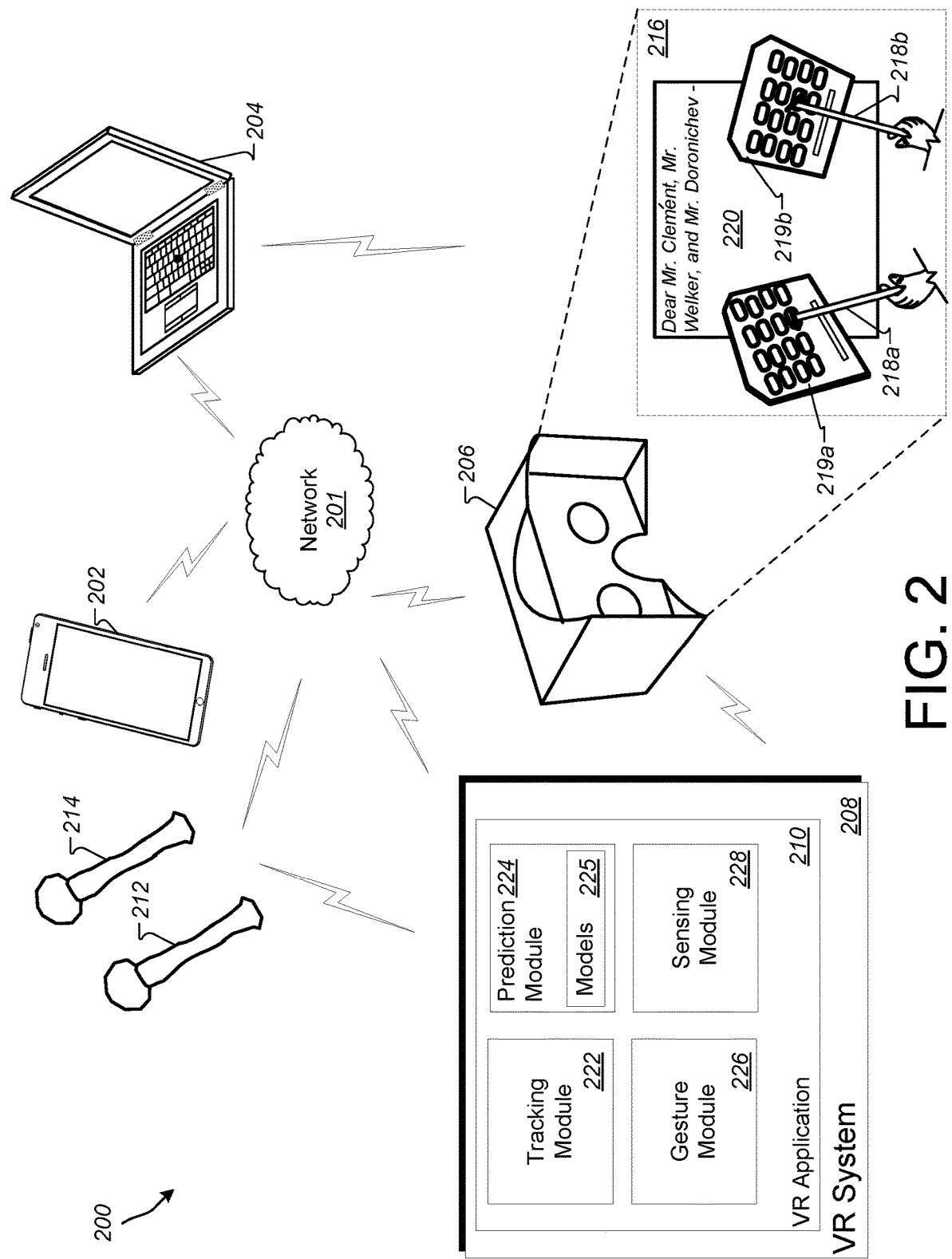
FIG. 2 is a block diagram of an example system providing various modes in which to input textual content in a VR space.

Referring now to FIG. 2, a block diagram is depicted of an example system 200 for providing various modes in which to input textual content in applications in a VR space. The system 200 may provide a 3D VR space and 3D (volumetric) objects and VR content using the methods, components, and techniques described herein. In particular, system 200 can provide a user with a number of options in which to interact with controllers to manipulate virtual objects and text entry within the VR space. In some implementations, the system 200 can enable the user to enter textual data using hand gestures tracked by system 200, rather than controllers.

The example system 200 includes a plurality of computing devices that can exchange data over a network 201. The devices may represent clients or servers and can communicate via network 201, or another network. In some implementations, the client devices may include one or more gaming devices or controllers, a mobile device, an electronic tablet, a laptop, a camera, VR glasses, or other such electronic device that may be used to access VR content.

As shown in FIG. 2, the system 200 includes a mobile device 202, a laptop computing device 204, a VR headset and/or a head mounted display (HMD) device 206, and VR system 208. Devices 202, 204, and 206 may represent client devices. Mobile device 202, computing device 204, and HMD device 206 can include one or more processors and one or more memory devices. The devices 202-206 can execute a client operating system and one or more client applications that can access, control, and/or display VR content on a display device included in each respective device, or in a connected device.

The VR system 208 may represent a server device. In general, VR system 208 may include any number of repositories storing content and/or virtual reality software modules that can generate, modify, or execute virtual reality scenes. In the depicted example, VR system 208 includes a VR application 210 that can access and present content and/or controls for system 208. In some implementations, VR application 210 can run locally on one or more of devices 202-206. The VR application 210 can be configured to execute on any or all of devices 202, 204, 206, and 208 and be controlled or operated upon using virtual controllers 212 or 214, for example.

Particular implementations described in this disclosure may enable a user to use one or more controllers to interact with the VR space for purposes of entering text into applications or with respect to virtual objects in the VR space. For example, the user can hold a first controller 212 and a second controller 214 to select and manipulate virtual objects in 3D in the VR space and to enter text into keyboards or other objects fashioned in the VR space. In some implementations, controllers 212 and 214 may be the same make and model. In other implementations, controllers 212 and 214 may be of a different make and model. Regardless of the type of controller, both controllers 212 and 214 can be viewed and/or tracked in system 200 in order to facilitate interaction in the VR space.

Example controllers 212 and 214 may each include a housing in which internal components of the controller device are received, and a user interface (not shown) on an outside of the housing, accessible to the user. The user interface may include a plurality of different types of manipulation devices (not shown in detail in FIG. 2) including, for example, touch sensitive surface(s) configured to receive user touch inputs, buttons, knobs, joysticks, toggles, slides and other such manipulation devices.

One or more sensors can be included on controllers 212 and/or controller 214. The sensors can be triggered to provide input to the VR space, for example, by users accessing controllers 212 and/or 214 and HMD device 206. The sensors can include, but are not limited to, a touchscreen sensors, accelerometers, gyroscopes, pressure sensors, biometric sensors, temperature sensors, humidity sensors, and ambient light sensors. The controllers 212 and 214 can use the sensors to determine an absolute position and/or a detected rotation of controllers 212 and 214 in the VR space. The positions and rotations can then be used as input to the VR space. In one non-limiting example, the controllers 212 and 214 may be incorporated into the VR space as a drumstick, a mallet, a stylus, a laser pointer, a mobile phone, a paintbrush, a pencil or pen, a drawing tool, a controller, a remote, or other object, etc. Such devices can be used to enter text in an intuitive and ergonomic fashion, as described throughout this disclosure. In some implementations, incorporated in the above sense means that a virtual drumstick, a virtual mallet, etc. is displayed and moved in the VR space corresponding to the respective counterpart and/or similar shaped counterpart in the physical environment.

Positioning of the controllers 212 and 214 by the user when incorporated into the VR space can allow the user to interact with particular virtual objects using rendered objects including, but not limited to drumsticks, mallets, stylus, laser pointer, mobile phone, paintbrush, pencil or pen, drawing tool, controller, remote, etc. Such positioning can be used, in some implementations, as a trigger for manipulating objects to create an ergonomic text entry device to facilitate text entry.

The HMD device 206 may represent a virtual reality headset, glasses, eyepiece, or other wearable device capable of displaying virtual reality content. In operation, the HMD device 206 can execute a VR application, which can playback received and/or processed images to a user. In some implementations, the VR application 210 can be hosted by one or more of the devices 202, 204, 206, or 208, shown in FIG. 2.

In some implementations, the example HMD device 206 may include a housing coupled to a frame, with an audio output device including, for example, speakers mounted in headphones. In the example HMD device 206, a display (note shown) may be mounted on an interior facing side of the front portion of the housing. Lenses may be mounted in the housing, between the user's eyes and the display. In some implementations, the HMD device 206 may include a sensing system 260 including various sensors such as, for example, audio sensor(s), image/light sensor(s), positional sensors (e.g., inertial measurement unit including gyroscope and accelerometer), and the like. The HMD device 206 may also include a control system including processors and various control system devices to facilitate operation of the HMD device 206.

In some implementations, the HMD device 206 may include one or more cameras (not shown) to capture still and moving images. The images captured by such cameras may be used to help track a physical position of the user and/or the controllers 212 or 214 in the real world, or physical environment relative to the VR space, and/or may be displayed to the user on the display in a pass through mode, allowing the user to temporarily leave the virtual environment and return to the physical environment without removing the HMD device 206 or otherwise changing the configuration of the HMD device 206.

In some implementations, the mobile device 202 can be placed and/or located within the HMD device 206. The mobile device 202 can include a display device that can be used as the display screen for the HMD device 206. The mobile device 202 can include hardware and/or software for executing the VR application 210. In some implementations, HMD device 206 can provide full tracking of location and user movements within six degrees of freedom. The tracking can be based on user hand movements, head movements, eye movements, or tracking of controllers moving based on user input.

Additional devices are possible and such devices may be configured to be substituted for one another. In some implementations, the devices 202, 204, 206, and 208 can be laptop or desktop computers, smartphones, personal digital assistants, portable media players, tablet computers, gaming devices, or other appropriate computing devices that can communicate, using the network 201, with other computing devices or computer systems.

In the example system 200, the HMD device 206 can be connected to device 202 or device 204 to access VR content on VR system 208, for example. Device 202 or 204 can be connected (wired or wirelessly) to HMD device 206, which can provide VR content for display.

In some implementations, one or more content servers (e.g., VR system 208) and one or more computer-readable storage devices can communicate with the computing devices 202, 204, 206 using network 201 to provide VR content to the devices 202-106. In some implementations, the network 201 can be a public communications network (e.g., the Internet, cellular data network, dialup modems over a telephone network) or a private communications network. In some implementations, the computing devices 202-108 can communicate with the network 201 using one or more high-speed wired and/or wireless communications protocols (e.g., 802.11 variations, Wi-Fi, Bluetooth, Transmission Control Protocol/Internet Protocol (TCP/IP), Ethernet, IEEE 802.3, etc.).

In some implementations, the mobile device 202 can execute the VR application 210 and provide the content for the VR environment. In some implementations, the laptop computing device can execute the VR application 210 and can provide content from one or more content servers (e.g., VR system 208). The one or more content servers and one or more computer-readable storage devices can communicate with the mobile device 202 laptop computing device 204, and/or controllers 212 or 214, using the network 201 to provide content for display in HMD device 206.

Example content is provided for display in the HMD device 206 at example user interface 216. In the example interface, a user and subsequent input is represented by hands holding drumstick 218a and 218b. The user is shown typing an email message 220 using keyboards 219a and 219b to enter text. In some implementations, the system 200 can determine position, force, acceleration, deceleration, and velocity of drumstick strikes to determine particular text entries associated with user movements.

As shown in FIG. 2, the VR application 210 includes a tracking module 222, a prediction module 224, a gesture module 226, and a sensing module 228. The tracking module 222 may access light sensors, audio sensors, image sensors, distance/proximity sensors, positional sensors, accelerometers, inertial measurement units (IMUs), and/or other sensors associated with sensing module 228 to track a physical position of the user and/or body parts belonging to the user as well as movements associated with the controller 212 or 214 in the real world, or physical environment relative to the virtual environment.

In some implementations, the tracking module 222 may include visually tracking user movements using one or more photo sensors and/or cameras. The photo sensors and/or cameras can be used to detect an absolute location (and/or movement (e.g., vector)) in physical space and translate such locations in the VR space. The absolute location may pertain to users and/or user movements and/or device movements occurring in the physical space. In addition, absolute location (and/or movements) can be used in tandem with other tracking mechanisms described herein. For example, an absolute location for a user can be used to determine where a user hand movement performed in physical space will impact a location on a virtual object in the VR space. In some implementations, one or more cameras can be used to determine an absolute location and movements associated with such locations. In some implementations, one or more IMUs may be used to verify such determinations by the one or more cameras.

In operation of system 200, a user may physically move in a prescribed physical space in which the system 200 is received and operated. The system 200 may track user movement in the physical space, or the real world, and cause the virtual world to move in coordination with user movement in the real world. This positional tracking may thus track a position of a user in the real world and translate that movement into the virtual world to generate a heightened sense of presence in the virtual world.

In some implementations, this type of motion tracking in the physical space may be accomplished by, for example, a tracking device such as a camera positioned in the space, and in communication with a base station generating the virtual world in which the user is immersed. This base station may be, for example, a standalone computing device, or a computing device included in the HMD worn by the user. In some implementations, the tracking module 222 may not just track the physical position and movement of the user in a VR space, but may also detect when the user is within a predetermined distance, or threshold, of a boundary or edge of a tracking area or virtual object.

The prediction module 224 may access any number of memory storage and/or sensors described herein to determine particular incoming movements associated controllers, users, virtual objects, and areas associated with moving objects within the VR space. The predication module 224 can generate a number of prediction models 225 that predict zones in which contact may occur between user moveable virtual objects (e.g., drumsticks) and virtual objects (e.g., text entry devices) simulated in a VR space.

In some implementations, the prediction models 225 may include predictions related to time. For example, the prediction models 225 may determine a predicted time of a virtual contact of a virtual controller (e.g., drumstick) with a virtual object (e.g., virtual keyboard). The prediction can, for example, be based on velocity of movement, position and orientation, heading, course, or other factor associated with the virtual controller or the virtual object.

In some implementations, the prediction module 224 may analyze six dimensions of data (e.g., six degrees of freedom tracking data) to determine particular positions, trajectories, velocities, course, and/or heading. In some implementations, the prediction module 224 can generate and use a number of prediction models to carry out predictions. For example, one prediction model may pertain to a particular virtual object. If a user alters the size (e.g., length, shape, height, etc.) of such a virtual object, then the prediction model associated with that object can be altered. That is, the system 200 can detect that a particular virtual object has been altered and in response, can update the prediction model to more accurately predict how virtual object contact may occur with the altered object. The altering of virtual objects can pertain to colliders (e.g., drumsticks, hands, controllers, etc.) as well as contact receiving objects (e.g., keyboards, instruments, walls, virtual objects, etc.). For example, a collider, such as a controller or user body part can be altered in a virtual space view to optimize interaction with any number of virtual objects In some implementations, the predictions described herein may pertain to anticipating (e.g., expecting, etc.) particular movements at particular times. Such predictions may use any number and/or types of methods and/or algorithms to predict future movement, velocity, force, momentum, area of contact, zone of contact, direction of incoming contact between objects, position, etc.

In some implementations, the prediction module 224 may determine when to initiate a rendering of an object display output (e.g., rendering/displaying text based on keystrokes). The object display output may be triggered by the prediction module 224 to initiate rendering of the object at a time preceding anticipated contact so that any latency (e.g., processing latency, rendering latency, etc.) may allow the object output to begin at, for example, an approximate time of actual contact (or intended contact time).

The gesture module 226 can sense/detect particular gestures to obtain both position and orientation data associated with gestures performed by a user accessing the VR space, for example. In some implementations, the sensing of the gestures may be performed using cameras to detect absolute positioning of the user and/or objects interacting with the VR space (e.g., controllers, mobile devices, drumsticks, hands, etc.). In some implementations, the sensing of gestures can be performed using IMUs, accelerometers, cameras, proximity sensors, or any combination thereof to determine an absolute position for the user and/or objects interacting with the VR space. The sensing can be performed using one or more internal sensors within an HMD device, on the user's person, or within a controller. In some implementations, the sensing can be performed using one or more external sensors not on the users person (e.g., external cameras, IMUs, sensors, proximity detection, etc.). Using the position and orientation associated with user actions in the VR space, the prediction module 224 can determine a velocity associated with each user action.

The velocity can be used to predict a precision of user actions. For example, the prediction module 224 can predict a contact or virtual impact of the tip of a drumstick 106 with a particular key on the virtual keyboard 110. Namely, calculated velocities of user actions (e.g., movements, arm swing, etc.) can be used to predict future contact between virtual objects or between user interactions/contact with virtual objects.

In some implementations, the gesture module 226 may access tracked and/or recorded movements provided by the tracking module 222, for example. The module 226 can use tracked information to employ any number or type of method or algorithm to detect user-performed gestures. Example gestures may include a flip, a flick, a grasp, a pull, a strike, a slide, a position adjustment, a push, a kick, a swipe, etc. The gestures may be carried out by the user using one or more of a limb, a head, a body, a finger, a hand, a foot, etc. The gestures can be qualified by comparing one or more parameters of the gesture. Example parameters may include a range of movement, a velocity of movement, an acceleration of movement, a distance of movement, a direction of movement, and/or a contact associated with the movement and one or more virtual objects in the VR space.

As for the sensing module 228, any number of sensors can provide (e.g., feed) input to system 200 via the sensing module 228. The sensors may include light sensors, audio sensors, image sensors, distance/proximity sensors, positional sensors or other sensors as well as sensors or inputs that can communicate with control systems associated with such sensors. The VR system 208 can utilize sensing module 228 to track and predict user inputs associated with the VR space.

Figure 3A:
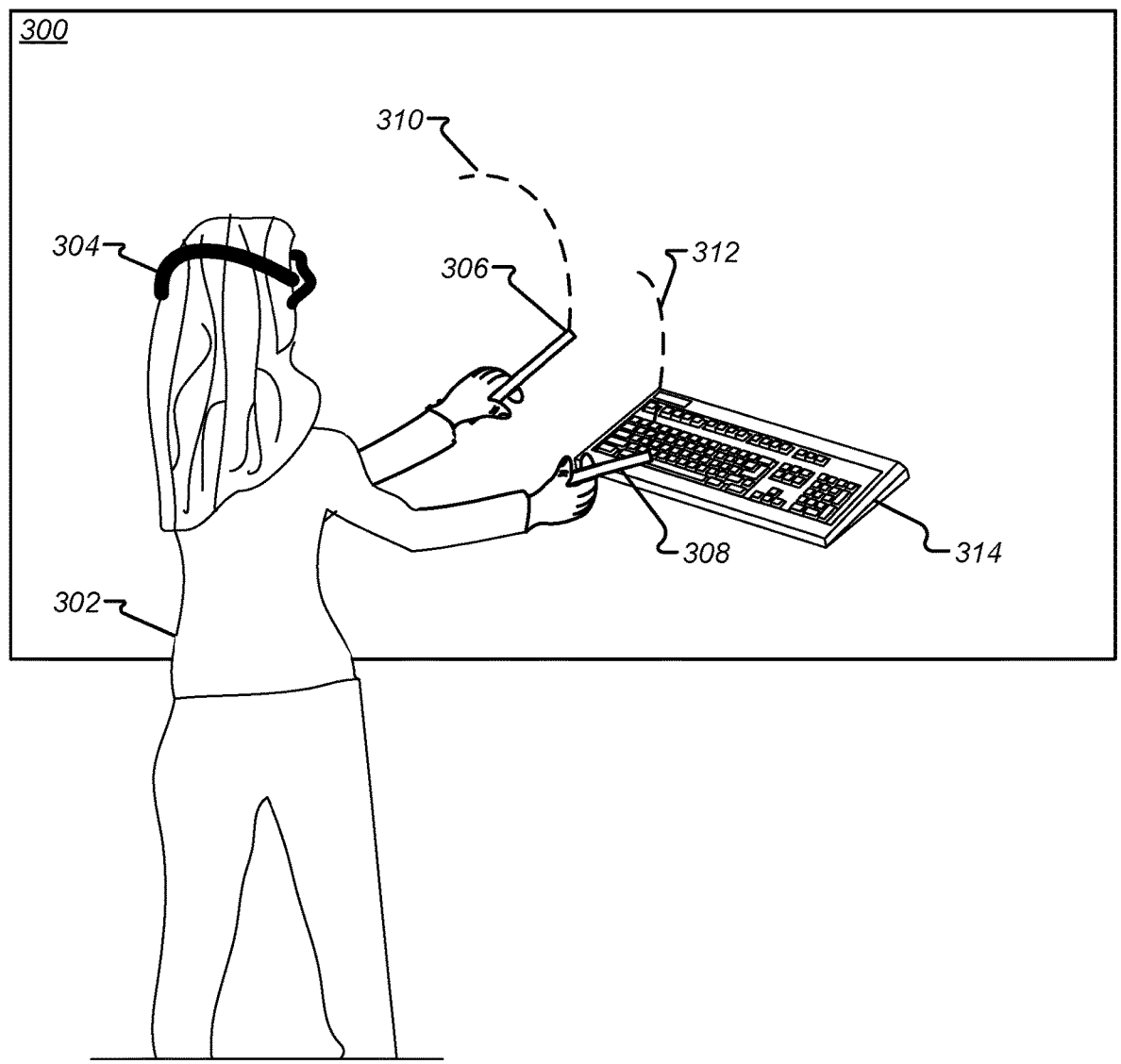
FIGS. 3A-3C illustrate examples of a user accessing a VR space to perform interactive tasks.

FIG. 3A illustrates a user accessing a VR space to perform interactive tasks. The example implementation shown in FIGS. 3A and 3B will be described with respect to a view 300 of a VR space and a user 302 wearing an HMD device 304 that substantially blocks out the ambient environment, so that the HMD device 304 generates the virtual environment/VR space, with the user's field of view confined to the VR space generated by the HMD device 304.

The HMD device 304 (or other VR components) may capture images and/or collect information defining features in the VR space. The images and information collected by the HMD device 304 (or by one or more tracked hands, drumsticks, or controllers (e.g., drumsticks 306 and/or 308) may then be processed by the HMD device 304 to render and display the view 300 of the VR space and any number of virtual objects. In general, drumsticks 306 and 308 may be controlled by controllers, hands, arms, eye movements, or other trackable input.

In the example shown in FIG. 3A, the user 302 wearing the HMD device 304 is facing into a room defining a VR space in view 300. View 300 represents what the user 302 may view in VR space using HMD device 304. The user 302 may be moving drumsticks 306 and 308 in arcing motions designated by respective paths/trajectories 310 and 312. The movements shown here indicate motions to enter text, numbers, or symbols on keyboard 314.

Elements in system 200 may be referred to throughout the examples in this disclosure. Such elements can be considered part of underlying software, firmware, or hardware usable with systems described below and depicted in the figures. For example, the system 200 and in particular, the tracking module 222, the prediction module 224, the gesture module 226, and the sensing module 228 can function together to determine intended textual input based on the movements performed by user 302 and to output text in a VR space user interface accordingly.

In one non-limiting example, the user 302 may be swinging drumsticks 306 and 308 to interact with keyboard 314 in VR space shown in view 300. The tracking module 222 can track the user movements, the objects such as drumsticks and keyboard in the VR space. The gesture module 226 can use the tracking information in combination with any sensors tracked and/or measured by sensing module 228 to determine trajectory, velocity, and contact areas and timing associated with the swinging drumsticks 306 and 308.

In some implementations, user-entered text may be performed using drumming or mallet swinging motions toward an ergonomically modified keyboard, electronic device, or other virtual object capable of receiving text input. The modifications can pertain to shape, size, location, or other user-selected object change. A user may modify a keyboard to be a three-dimensional volumetric keyboard fashioned on a cube shape, drum or other musical instrument, or other shape, just to name a few examples. The input can be provided as if the user were playing drums or a xylophone. In other examples, the user may use hands and fingers to simulate text entry by typical typing motions or by full hand or arm motions toward a text entry virtual object.

In response to user movement toward the keyboard 314, for example, the system 200 described herein can analyze an arc, a heading, and a velocity associated with each movement. The system 200 can use such information to predict a contact zone (e.g., collision zone) for the controller, hand, drumstick, etc. For example, if a user movement is detected in a downward motion toward the keyboard 314, the system 200 can determine that the user movement is intentional and associated with selecting a key on the keyboard 314. The downward motion, the arc, the heading (e.g., trajectory), and velocity can be used to predict a next keystroke.

In some implementations, the system 200 can filter out movements that do not coincide with the contact zone and can additionally filter out particular movements that may provide errors in text input or inadvertent contact with other keys and objects in the VR space. In general, the movement analysis and predictions described herein can be performed with three and/or six degrees of freedom with respect to the user and objects rendered in the VR space.

In some implementations, the keyboard 314 may be any shape or size to accommodate user text entry. For example, a keyboard may be provided in the VR space as a sphere in which a user can enter text. The sphere may include keys that are oval, circular, three-dimensional, or other shape that a user can select with a hand, virtual object, or physical object. The sphere can also provide selectable keys on a bottom surface of the sphere. Users may select keys with a downward motion on the top surface of the sphere and an upward motion on the bottom surface of the sphere.

Figure 3B:
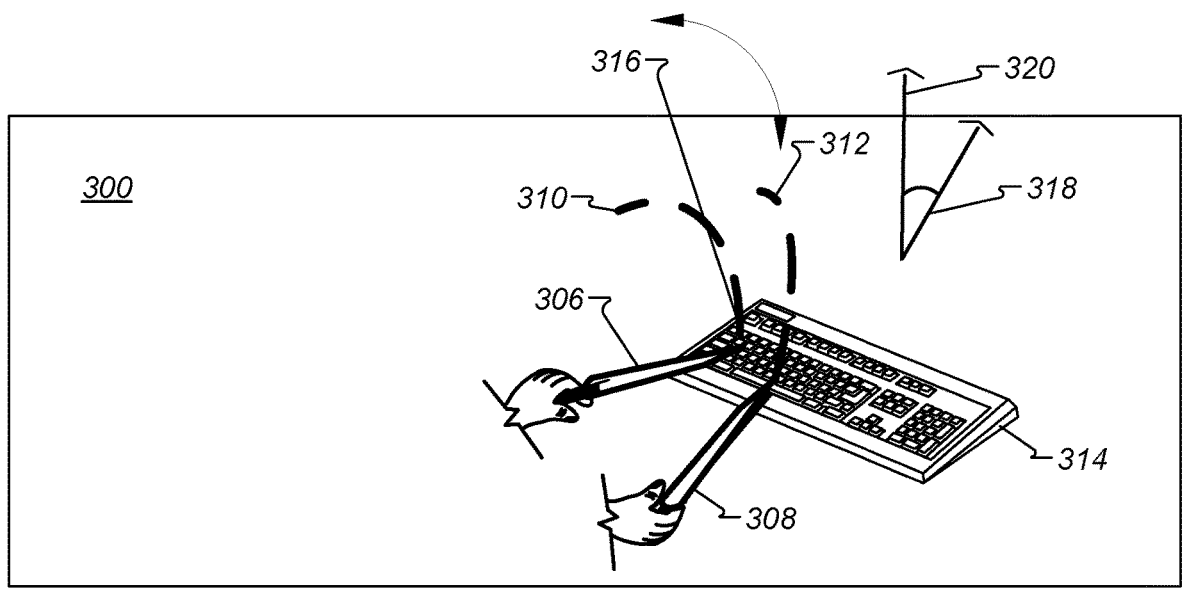

FIG. 3B illustrates an example analysis of particular movements in VR space. Although the example described in FIG. 3B refers to drumsticks, any object or body part may be substituted to perform the same or similar movements. Each movement the user 302 performs with drumstick 306, for example, includes a heading, a velocity, and a course. The heading may refer to a direction 318 in which a tip 306 of drumstick 316 is currently pointing, which may also indicate an orientation. In particular, the heading may pertain to an angle created between the direction in which the tip 306 is pointing and a particular reference direction (e.g., true north 320). The system 200 may determine particular heading or orientation using tracking mechanisms to detect hand orientation, controller orientation, or other virtual object orientation with respect to user movements and contact with a controller or virtual object.

The course may refer to a path or arc that the drumstick may follow during a user movement. The course may begin at a backswing and end at a contact zone on a virtual object, for example. In some implementations, the heading encompasses the course and as such, the course may be ignored in particular calculations.

The velocity of the movement may include a speed at which the drumstick is moved toward or away from particular virtual objects in the VR space. In some implementations, the velocity may pertain to a speed at which the user is moving one or more controllers or drumsticks (e.g., virtual controllers 212, 214 or drumsticks 306, 308) or other tracked virtual object. The velocity can be used to predict a contact zone for the tip of the controllers or drumsticks. In addition, the system 200 (e.g., gesture module 226 and prediction module 224) can analyze and predict a lifting movement, arcing movement, sliding movement, or other directional movement indicating that the user is moving the controller or drumstick to contact (e.g., land, collide) with another key or key(s) on the keyboard 314, for example, The position, orientation, and velocity can be used to determine an actual trajectory that the user (or device associated with the user) may be following when moving the drumsticks between letters on the virtual keyboard, for example. This trajectory follows in arcing motions from letter to letter. The direction associated with each of the arcs can be used to determine if a best prediction can be determined for text entries.

For example, in an upswing or backswing, the system 200 may determine that letter entry is not occurring and may analyze sideways motion or other tracking affiliated with moving between letters rather than with selecting letters on a keyboard. Once the user performs an action to arc downward, the system 200 detects movement near the keyboard surface and can predict an impact area in which letters may be contacted with/selected. The letters near the impact area can be selected for possible targets, and other factors such as actual location, velocity, and distance can be used to predict one letter. All of this prediction can occur before the user actually selects any letters. Additional predictions can be made to predict actual words being typed before user selection of the letters completing the words.

In some implementations, the prediction module 224 can determine to acknowledge keystrokes or gestures indicating keystrokes when such gestures are performed at or above a particular force and/or or velocity. Thus, even if the user were to strike at an angle to engage an 's' key on the keyboard, the system 200 may not accept the strike and may not type the text 's' if the force of the stroke is measured as being less than a threshold amount. The prediction module 224 and system 200 can function together to suppress any number of keystrokes (i.e., input) based on determining that the user-provided gesture was unintended.

In one non-limiting example, if the user leans onto a virtual keyboard or virtual menu, the system 200 may suppress any and all keystrokes or menu selections, based on determining the angle of the input is atypical (e.g., not meant to provide input/accidental selection/misguided selection) or otherwise in contrast to expected input movement associated with the keyboard, menu, and/or virtual object. In some implementations, the system 200 may suppress keystrokes or input based on determining that the input is atypical according to known behavior or settings configured for the user performing the input. One of the technical effects and advantages of suppressing keystrokes according to the above is that input by a user indicating keystrokes can be determined with higher accuracy when the user performs movements and/or gestures that are unrelated to input indicating keystrokes, such as tremble or inadvertent movement and/or gesture.

In some implementations, virtual keyboard 314 (or other virtual keyboard) may function as a controller-driven virtual object that responds by outputting text if, for example, a user flicks, swings, hits keys on the virtual keyboard. The system 200 can account for and make decisions based on particular, impact/contact velocity of the input source, heading and/or direction associated with the input, and particular angle in which the input is provided. For example, if a user drafted an email and had yet to complete the prose, an input that includes striking a send button while also striking other keys in areas on the keyboard (or areas in the VR space) that are not adjacent to the send button can trigger the system 200 to provide one or more messages to the user about whether she intends to send the draft based on the additional detected movements. Similarly, the system 200 can ignore keystrokes or actions based on detecting other actions performed concurrently with text entry for the email. For example, if the user is striking a keyboard with a virtual drumstick and the user's finger touches a space bar on the keyboard (or other unintended contact), the system 200 can determine that the drumstick tip is the intended striking mechanism and can ignore the finger on the space bar.

In another example, the system 200 may suppress particular inputs based on a head position or eye gaze being focused away from actions being performed. For example, if a user is intending to interact with a virtual object next to the keyboard, but has one hand on the keyboard, the system 200 may suppress keyboard strokes while the user is interacting with the virtual object.

In some implementations, the system 200 can use the prediction mechanisms described herein to correct text input. For example, if a user incorrectly spells particular words, the system 200 can detect that, and can update a model of what the user is attempting to type based on her movements. The updated model can continually learn user actions in this manner.

Figure 3C:
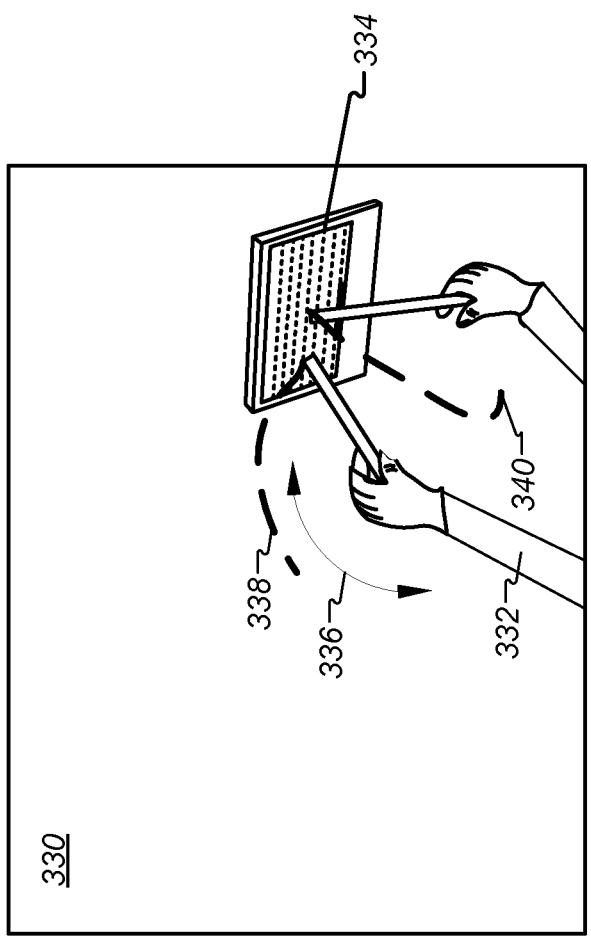

Referring to FIG. 3C, a VR space 330 depicts a representation of a user 332 entering input into a virtual object 334 using upward swinging motions 336, as shown by trajectories 338 and 340. Here, the system 200 can determine that a user is lying down and swinging upward to enter text into virtual object 334. In this example, the upward motion can trigger a detection and prediction of impact while a downward motion in this example may not trigger a detection or prediction. In this fashion, the system 200 can use an upward, diagonal, and/or sideways motion as an indicator for keystroke detection based upon a detected position of a user.

Figure 4A:
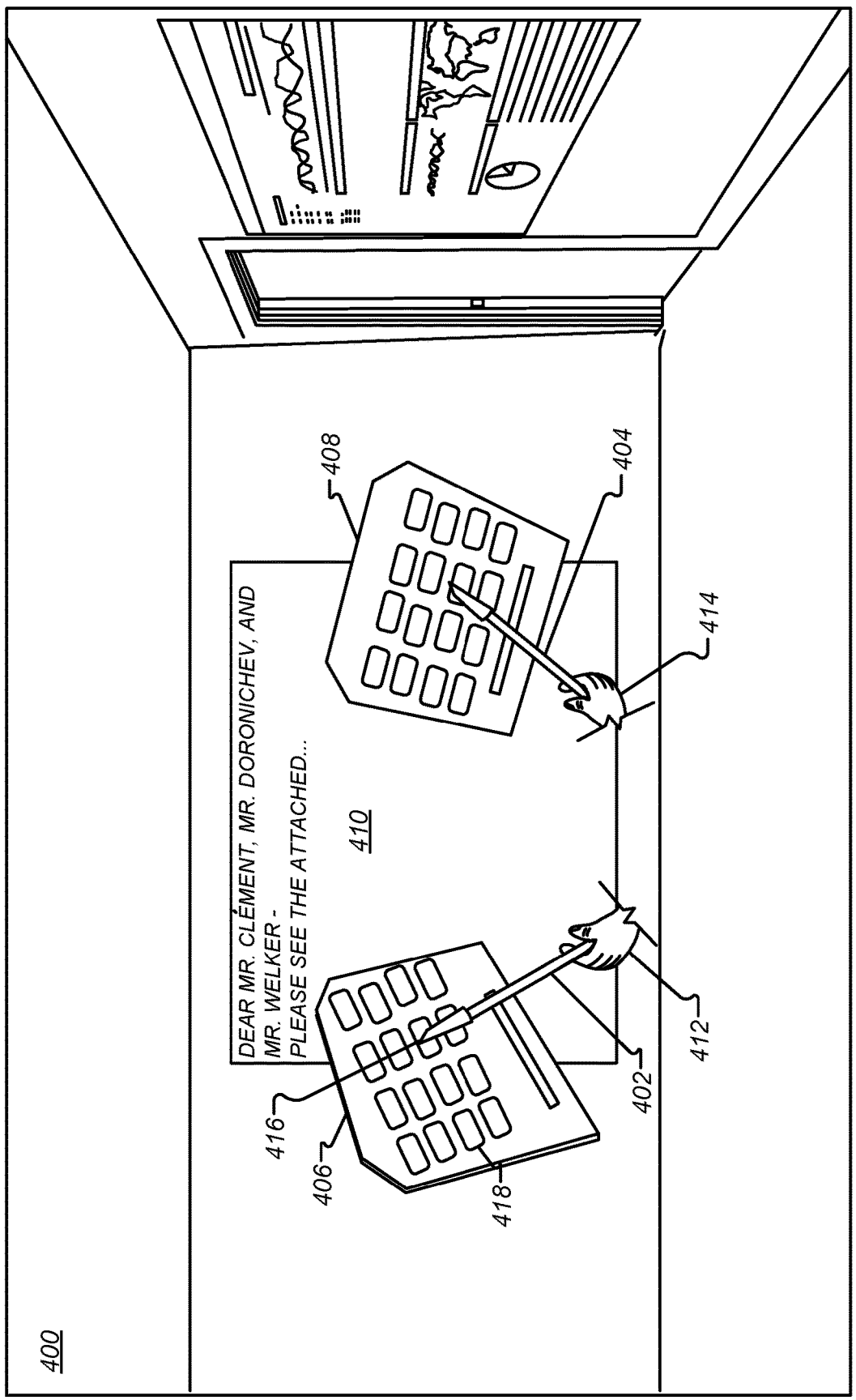
FIGS. 4A-4B illustrate an example of showing a VR space in which to perform textual input activities.

FIG. 4A illustrates an example of a user accessing a VR space 400 to perform textual input activities. In general, the system 200 can analyze user interactions in the VR space to determine how to manipulate a particular virtual object based on detected user interactions. The determination can be used to provide the user with a response that is directed to a desired object manipulation requested by the user via the detected user interaction/gesture. For example, when the user attempts to swing drumsticks 402 and 404 at respective virtual keyboard objects 406 and 408, respectively, the system 200 can determine which key or keys the user intends to engage in order to type message 410 (e.g., DEAR MR. CLEMENT, MR. WELKER, AND MR. DORONICHEV—PLEASE SEE THE ATTACHED . . . ). In some implementations, the system 200 can determine which (VR space-based) reaction matches the intent for the user using the drumsticks (or other input device) and can react according to information associated with properties of the virtual objects and the VR space. In this example, the system 200 can predict which keys the user intends to type before the typing is carried out. The prediction can be performed using tracking methods taking into account position and orientation detection of user input within six degrees of freedom, and calculations of trajectory, course, heading, and/or velocity of controller movements.

In one non-limiting example in FIG. 4, a VR space 400 is shown with a user interacting with a number of virtual keyboard objects 406 and 408. Keyboard objects 406 and 408 may have been designed or shaped by the user based on ergonomics, user preferences, user measurements, VR application requirements, open applications, or other metric affecting input with the virtual keyboard objects 406 and 408.

Here, the user may grasp his first hand 412 onto the first drumstick 402 and his second hand 414 onto the second drumstick 404. The two-handed grasp may be used to control one or more input areas (e.g., keyboards) to carry out text entry in view 400. In the depicted example, the user may move his right hand 414 upward and his left hand 412 downward and can enter text into area 410 by continuing to drum on the virtual keyboard objects 406 and 408. The system 200 can use tracking, prediction models, and calculations to determine that the user wishes to select key 416 with her left hand, rather than key 418 (or another key other than key 416). The system 200 can predict input at key 416 and provide text corresponding to the key 416 upon receiving an actual user action that includes contacting the tip of the drumstick 402 into key 416 in the VR space.

In some implementations, the system 200 can track a degree of rotation corresponding to one or both hands or controllers associated with the user in the VR space. The degree of rotation can be used in a prediction model to determine which key the user intends to select on a virtual keyboard object. For example, if the keyboard shown in FIG. 4B provides keys at various angles to the user, the system 200 can detect a degree of rotation in a particular entry mechanism (e.g., a drumstick, a controller, a hand, etc.) and use the degree of rotation to predict an impact location on the keyboard based on the keyboard location/angle and the angle of rotation of the entry mechanism.

In some implementations, using drumstick entry mechanisms can provide privacy advantages. For example, in a multi-user co-presence VR space, drumming may easily obfuscate which text or symbols a user enters into the VR space applications. To another user in the same VR space, the user may appear to simply swinging her arms up and down, rather than selecting keys on a keyboard.

Figure 4B:
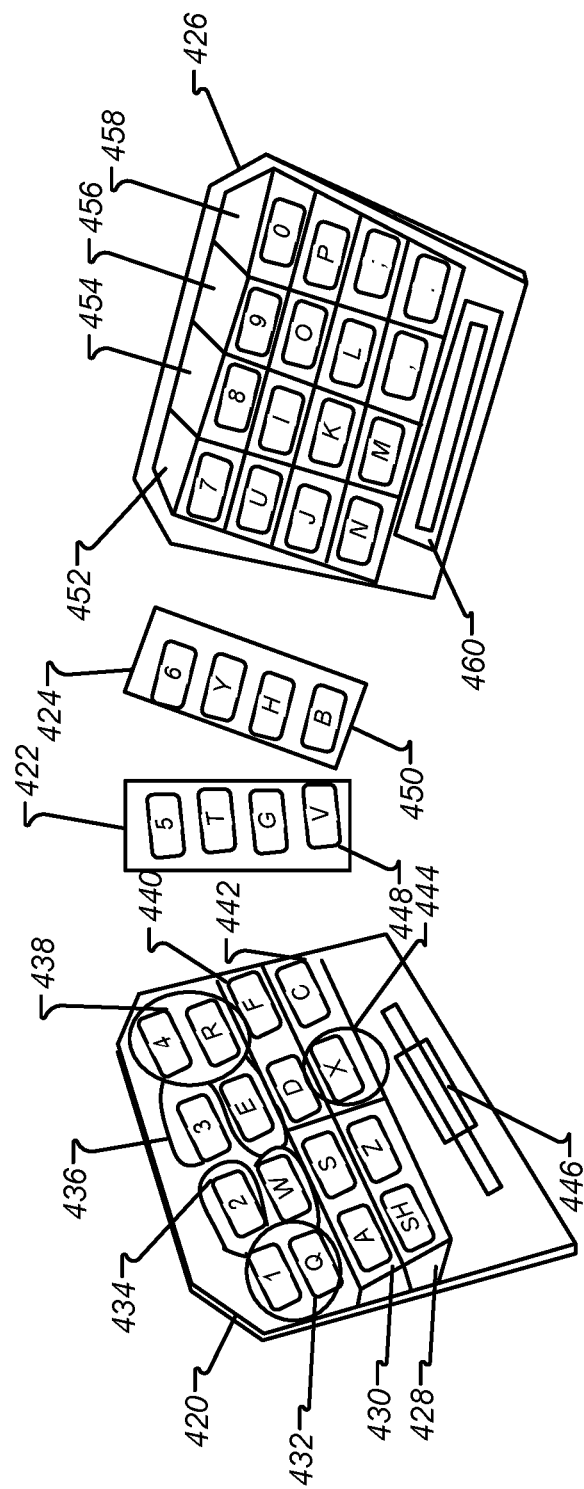

FIG. 4B illustrates a virtual keyboard object for receiving input in a VR space. The virtual keyboard object includes a portion 420, a portion 422, a portion 424, and a portion 426. Each key shown on portions 420-426 may be part of a selectable volumetric zone in VR space. In some implementations, multiple keys may be included in a single volumetric zone. In other implementations, overlapping zones may be created around a key (e.g., may entirely or partially surround a key). In some implementations, a volumetric zone can entirely or partially surround a target 3D VR object. In general, a user can motion to simulate any number of key depress actions on the virtual keyboard object using drumsticks 402 or 404, for example, to trigger the system 200 to output text in a user interface. The outputted text may correspond to particular selected keys.

In operation, the system 200 (or a user) can configure volumetric zones such as zones 428-460 (or additional zones, not labeled, but shown in FIG. 4B). The volumetric zones are configured for three-dimensional virtual objects to receive virtual contact on the objects. Volumetric zones can be selected anywhere within a three-dimensional space that the zones occupy. Although some keys on the keyboard portions are shown in two dimensions in the figures, the keys are intended to be represented as 3D selectable keys on a 3D virtual keyboard. Thus, the keys may be selected by a user and the system 200 can render depression of such keys in a visual and/or audial manner. Therefore, the volumetric zones are intended to occupy a volume or shape surrounding (or at least partially surrounding) the key or keys. As such, if a user selected zone 436 from a top angle or from behind keyboard portion 420, the system 200 may register that the '3' key was selected and may output a '3' in a user interface associated with the VR space.

Figure 5:
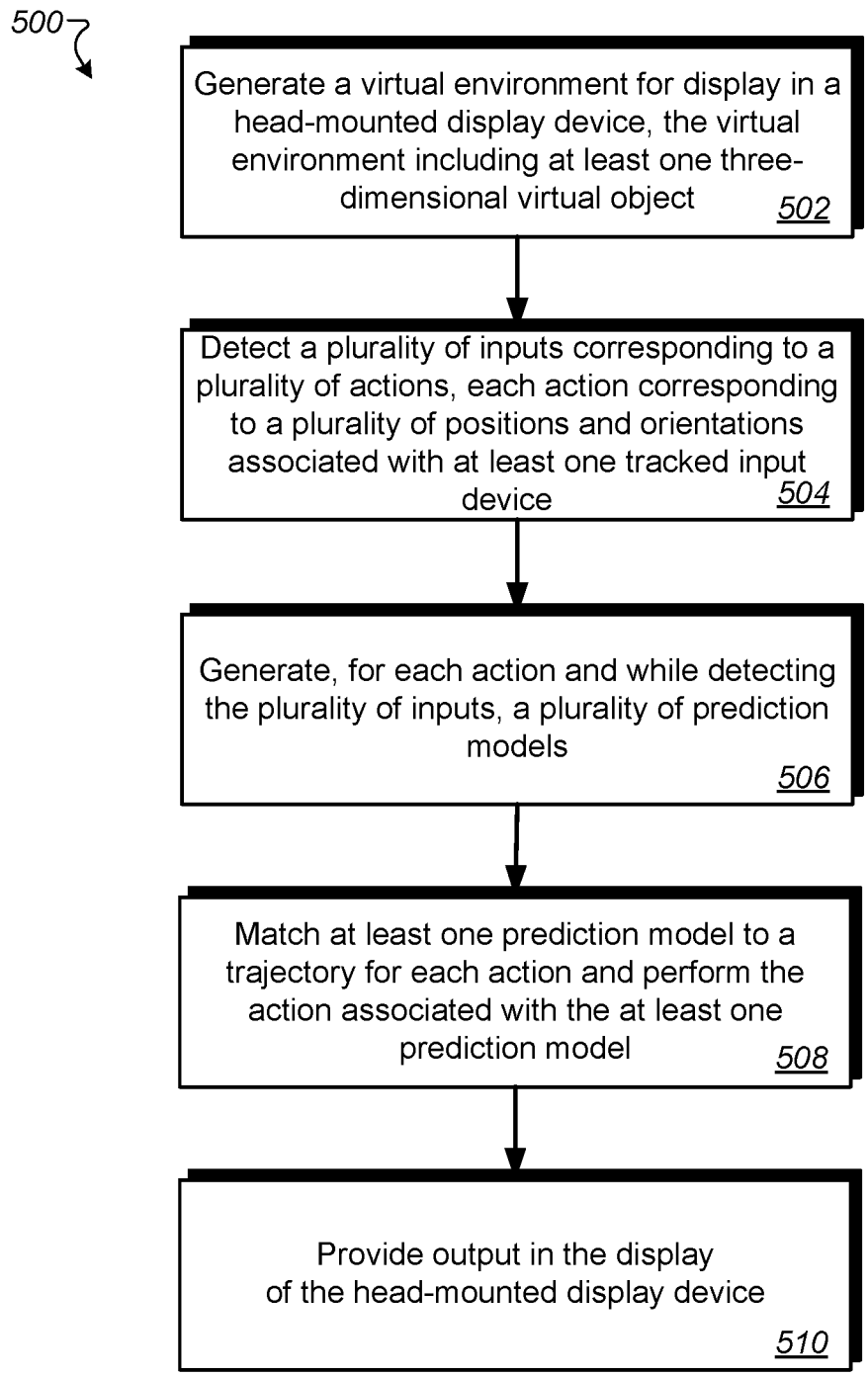
FIG. 5 is a flow chart diagramming one embodiment of a process to predict a contact zone associated with an input provided in a VR space.

FIG. 5 is a flow chart diagramming one embodiment of a process 500 to predict a contact zone associated with an input provided in a VR space. The process 500, at block 502, can include generating a virtual environment for display in a head-mounted display device. For example, the VR system 208 can generate the virtual environment 100 shown in FIG. 1. The virtual environment may include at least one three-dimensional virtual object with a number of volumetric zones configured to receive virtual contact. For example, the virtual environment 100 includes a keyboard 110 that includes several keys and input areas in which to receive virtual contact from drumsticks 106 or 108, controllers (not shown), or user hands.

In some implementations, the virtual environment includes at least one configurable text entry device and the input corresponds to entries performed on the configurable text entry device. In some implementations, the configurable text entry device (e.g., the at least one tracked input device) may be a set of two virtual reality controllers depicted in the virtual environment as a set of two drumsticks. For example, the keyboard 110 may be a virtual keyboard object that can receive input from drumsticks 106 or 108. Drumsticks 106 or 108 may be simulated by the VR system 200 to be controlled by controllers 212 and 214. In some implementations, the configurable text entry device is an electronic virtual keyboard ergonomically adaptable to a user accessing the virtual environment. For example, the user can adapt the keyboard to particular shapes, angles, and sizes.

In some implementations, the configurable text entry device (e.g., the at least one tracked input device) is a virtual object held by a hand of a user accessing the virtual environment. For example, the configurable text entry device may be a mobile device, a tablet, or other virtual object adaptable to provide selectable letter, number, or symbol keys.

The process 500, at block 504, may include detecting, with a processor, a plurality of inputs corresponding to a plurality of actions performed in the virtual environment on the at least one three-dimensional virtual object. For example, the gesture module 226, tracking module 222, and sensing module 228 may work to detect user movements, such as hand gestures, drumming or controller actions/movements. Each action may correspond to a plurality of positions and orientations associated with at least one tracked input device. For example, a drumming action or movement may correspond to a user swinging controller 212 and controller 214 to interact in the VR space with a virtual keyboard object.

The process 500, at block 506, may include generating, with the processor and for each action and while detecting the plurality of inputs, a plurality of prediction models. For example, the tracking module 222, gesture module 226, and/or sensing module 228 can detect and track user actions/movements, which may correlate to user inputs being performed at the virtual keyboard object. While the movements are occurring, the prediction module 224 can begin to generate a number of prediction models configured to determine a contact position/collision zone (i.e., on a keyboard key) with which the user intends to contact (e.g., interact, collide into). The contact may be controller to virtual object, drumstick (e.g. or other instrument to extend virtual controller reach) to virtual object (e.g., keyboard), hand to keyboard, and the like.

The plurality of prediction models may provide the system 200 with a number of alternatives for determining which of the plurality of volumetric zones on the virtual keyboard object art to be contacted with. For example, the process 500 can generate, with a processor and for each action and while detecting the plurality of inputs, a number of prediction models that can determine in which of the plurality of volumetric zones, a particular tracked input device is predicted to virtually collide.

In some implementations, the plurality of prediction models process six dimensions of spacial data for a determined course of travel corresponding to the tracked input device and one or more of the plurality of volumetric zones. The six degrees of freedom models can be generated, in some implementations, by processing the plurality of inputs that include, for each action, a heading, an angle, a course, and a derived velocity associated with an action or series of actions. In some implementations, the course may pertain to a trajectory and a contact (e.g., collision) zone in at least one of the plurality of volumetric zones. In general, the plurality of actions are tracked by system 200 in six degrees of freedom to determine a position and orientation associated with each action performed within the virtual environment. Such positions and orientations can be used to generate prediction models.

For each action associated with input, the process 500, at block 508, may include matching, with the processor, at least one prediction model from the plurality of prediction models to a trajectory corresponding to a virtual contact in at least one of the plurality of volumetric zones. For example, the prediction models (e.g., models 225) can determine which particular portion of the at least one tracked input device contacts (e.g., collides with) the three-dimensional virtual object. That is, the prediction models 225 may determine an intended contact (e.g., a contact indicated by a first part of a trajectory of a finger, drumstick, and/or device) between a drumstick 106/controller 212 and a volumetric zone (on the virtual keyboard object 110). In other words, a virtual contact between the at least on tracked input device and a volumetric zone may not have occurred at the time when the tracked input has been provided to the one or more prediction models. But, the prediction models predict that based on said input including heading, an angle, a course, and/or a derived velocity of the tracked input device, a contact is very likely to occur in the near future. In response to matching the at least one prediction model, the system 200 may perform an intended action associated with the at least one prediction model. A match occurs if the one or more prediction models predict a contact with the same volumetric zone and have the same associated action.

In some implementations, determining which of the plurality of volumetric zones a portion of the at least one tracked input device contacts is based at least in part on the plurality of positions and orientations associated with the at least one tracked input device and a derived velocity associated with (e.g., for) the at least one tracked input device. For example, system 200 can derive and/or calculate a velocity associated with a number of movements in the VR space. The movements may include a series of user-based movements in which image frames are captured over time. The image frames can be analyzed to determine orientation and position over time of a user's hand or controller. Such information can be used to derive or calculate a particular velocity associated with the movement. The velocity can enable the system 200 to determine and/or predict a contact area between a drumstick/controller/hand within a volumetric zone of a virtual keyboard object, for example.

The process 500, at block 510, may include providing output in the display of the head-mounted display device. The output may include a textual character corresponding to the virtual contact with at least one of the volumetric zones. For example, the output can include a letter in a view 100 in response to receiving drumstick input from drumstick 106 on the virtual keyboard object 110, at a key under the letter being contacted or selected via the input.

In some implementations, the process 500 may also include suppressing performance of a particular action associated with at least one prediction model, in response to determining a match does not exist between the at least one prediction model and a known or calculated trajectory associated with the action or series of actions/movements.

In some implementations, the process 500 can suppress performance of the action associated with the at least one prediction model based on determining that a force of a velocity associated with the action is below a threshold velocity. For example, if the system 200 detects that a user is simply leaning on several keys on the virtual keyboard object 110, the system can suppress keystrokes by determining that the impact on the keys is below a known impact for keystrokes carried out using hands, controllers, or other virtual objects being arced at or toward the virtual keyboard object. In some implementations, the threshold velocity may be configured to detect a speed at which keys are pressed. In some implementations, the threshold velocity may be configured to detect a pressure or force sensitivity placed on keys of the keyboard. In some implementations, the threshold velocity may be configured to detect a displacement sensitivity to an input to enable keystrokes to be logged if the keys are depressed a minimum amount of distance.

In some implementations, the plurality of prediction models may filter one or more of the plurality of actions to determine which of the actions corresponds to entering text on a virtual keyboard associated with the at least one three-dimensional virtual object. Such filtering can be used to suppress particular keystrokes.

Particular user-input mechanisms carried out in virtual reality environments may not provide for haptic, visual, or auditory feedback in response to receiving input. This missing feedback can cause difficulties for a virtual reality system when attempting to decipher user intent associated with user input. In general, deciphering input entered into a VR space can include employing a number of tracking algorithms and prediction algorithms. Such algorithms can be tuned to detect and analyze input for coarse modes and fine modes of movement associated with the input. Depending on the type of input, the systems and methods described in this disclosure may select one or more modes (or modes that perform particular levels between course and fine modes) in which to track and predict expected output triggered by such input.

For example, if the input pertains to text-entered input via eye gaze, a fine mode of movement analysis may be used. Error detection for the input can be provided by the systems and methods described herein to minimize noise created by inadvertent movement, interaction, or contact with virtual objects in the VR space.

Figure 6:
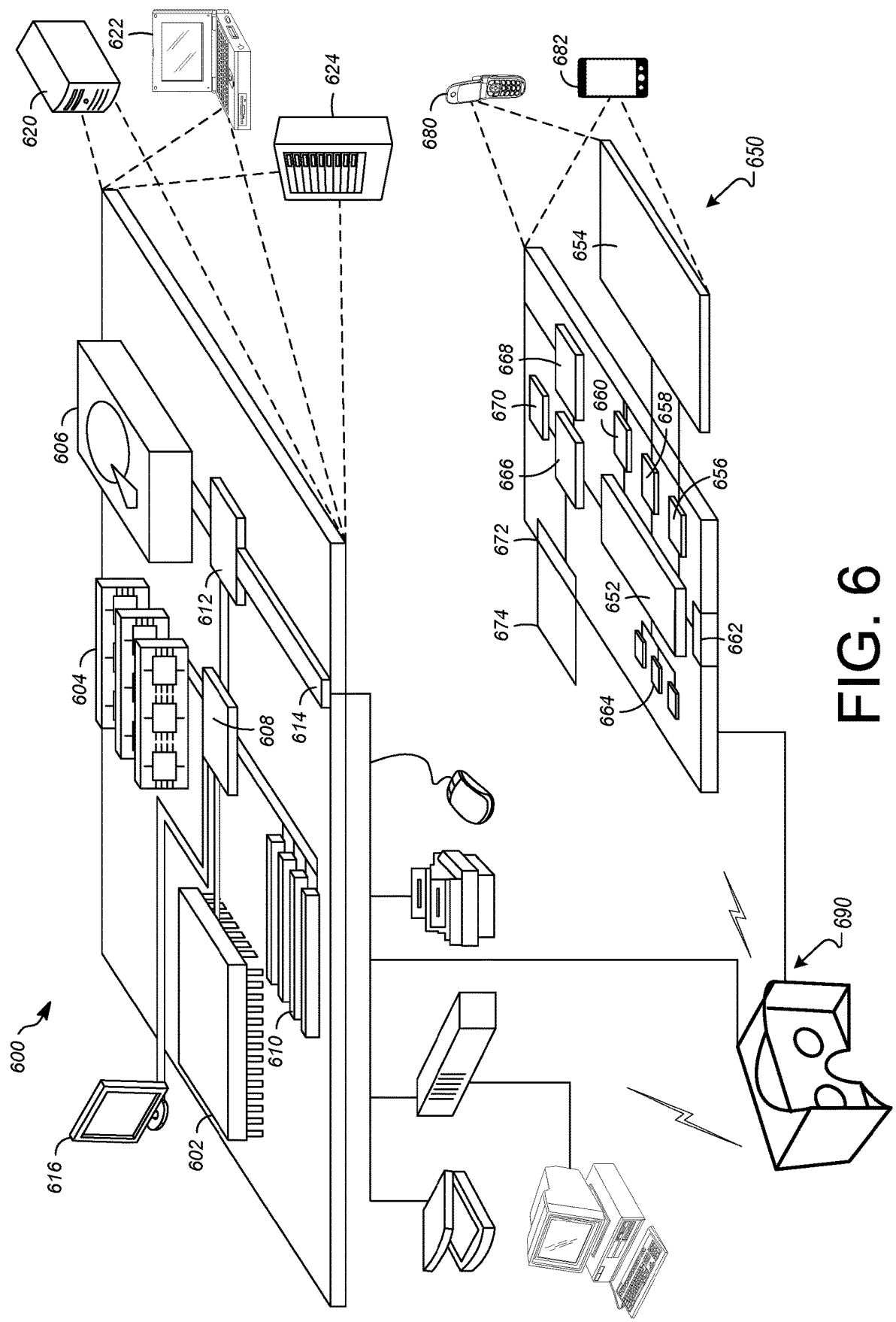
FIG. 6 shows an example of a computer device and a mobile computer device that can be used to implement the techniques described herein.

FIG. 6 shows an example of a generic computer device 600 and a generic mobile computer device 650, which may be used with the techniques described here. Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. In addition, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, Wi-Fi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 6 can include sensors that interface with a virtual reality (VR headset 690). For example, one or more sensors included on a computing device 650 or other computing device depicted in FIG. 6, can provide input to VR headset 690 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 650 can use the sensors to determine an absolute position and/or a detected rotation of the computing device in the VR space that can then be used as input to the VR space. For example, the computing device 650 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 650 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 650 when the computing device is incorporated into the VR space can cause a particular action to occur in the VR space.

In some implementations, a touchscreen of the computing device 650 can be rendered as a touchpad in VR space. A user can interact with the touchscreen of the computing device 650. The interactions are rendered, in VR headset 690 for example, as movements on the rendered touchpad in the VR space. The rendered movements can control objects in the VR space.

In some implementations, one or more output devices included on the computing device 650 can provide output and/or feedback to a user of the VR headset 690 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 650 may appear as another object in a computer-generated, 3D environment. Interactions by the user with the computing device 650 (e.g., rotating, shaking, touching a touchscreen, swiping a finger across a touch screen) can be interpreted as interactions with the object in the VR space. In the example of the laser pointer in a VR space, the computing device 650 appears as a virtual laser pointer in the computer-generated, 3D environment. As the user manipulates the computing device 650, the user in the VR space sees movement of the laser pointer. The user receives feedback from interactions with the computing device 650 in the VR space on the computing device 650 or on the VR headset 690.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
   generating a virtual environment for display in a head-mounted display device, the virtual environment including at least one three-dimensional virtual object having a plurality of volumetric zones configured to receive virtual contact;
   detecting, with a processor, a plurality of inputs corresponding to a plurality of actions performed in the virtual environment on the at least one three-dimensional virtual object, each action corresponding to a plurality of positions and orientations associated with a portion of at least one tracked input device;
   generating, with the processor, and for each action and while detecting the plurality of inputs, a plurality of prediction models, at least one of the plurality of prediction models including a trajectory and a probability of virtual collision of the portion of the at least one tracked input device with at least one of the plurality of volumetric zones;
   determining, based on the plurality of prediction models, in which of the plurality of volumetric zones the portion of the at least one tracked input device is predicted to virtually collide; and
   for each action,
      matching, with the processor, at least one prediction model from the plurality of prediction models to a tracked trajectory corresponding to a virtual collision between the portion of the at least one tracked input device and at least one of the plurality of volumetric zones, the tracked trajectory including at least a backswing and a downward arc,
      performing the respective action associated with the matched at least one prediction model, and
      providing, based on the respective action and the matching of the at least one prediction model, output in a display of the head-mounted display device, the output including a textual character corresponding to the virtual collision in the at least one of the plurality of volumetric zones.

2. The method of claim 1, wherein determining which of the plurality of volumetric zones a portion of the at least one tracked input device contacts is based at least in part on the plurality of positions and orientations associated with the at least one tracked input device and a derived velocity for the at least one tracked input device.

3. The method of claim 1, wherein the plurality of prediction models process six dimensions of spatial data for a determined course of travel corresponding to the tracked input device and one or more of the plurality of volumetric zones.

4. The method of claim 1, wherein generating the plurality of prediction models includes processing the plurality of inputs that include, for each action, a heading, an angle, a course, and a derived velocity.

5. The method of claim 4, wherein the course comprises a trajectory and a collision zone corresponding to at least one of the plurality of volumetric zones.

6. The method of claim 1, further comprising in response to determining a match does not exist between the at least one prediction model and the trajectory, suppressing performance of the action associated with the at least one prediction model.

7. The method of claim 1, further comprising suppressing performance of the action associated with the at least one prediction model based on determining that a velocity associated with the action is below a threshold velocity, the threshold velocity being configured to detect force sensibility associated with the action.

8. The method of claim 1, wherein the plurality of prediction models filter one or more of the plurality of actions to determine which of the plurality of actions corresponds to entering text on a virtual keyboard associated with the at least one three-dimensional virtual object.

9. The method of claim 1, further comprising for each action:
   selecting, based on a context associated with a user accessing the virtual environment, an intended application from a plurality of applications in which to perform the action, the context including a detected head position of the user accessing the virtual environment; and
   providing, according to the action and the context, output in the selected application for display on the head-mounted display device.

10. The method of claim 1, wherein the virtual environment includes at least one configurable text entry device and the input corresponds to entries performed on the configurable text entry device, the configurable text entry device including an electronic virtual keyboard ergonomically adaptable to a user accessing the virtual environment.

11. The method of claim 1, wherein the plurality of actions are tracked in six degrees of freedom to determine a position and orientation associated with each action performed within the virtual environment, each action corresponding to selecting keys on a virtual keyboard.

12. The method of claim 1, wherein the at least one tracked input device is a set of two virtual reality controllers depicted in the virtual environment as a set of two drumsticks.

13. The method of claim 1, wherein the at least one tracked input device is a virtual object held by a hand of a user accessing the virtual environment.

14. A system, comprising:

a computing device configured to generate an immersive virtual environment, the computing device including a memory storing executable instructions, and a processor configured to execute the instructions to cause the computing device to:

generate a virtual environment for display in a head-mounted display device, the virtual environment displaying at least one three-dimensional virtual object with a plurality of volumetric zones configured to receive virtual contact;

detect, a plurality of inputs corresponding to a plurality of actions performed in the virtual environment on the at least one three-dimensional virtual object, each action corresponding to a plurality of positions and orientations associated with a portion of at least one tracked input device;

generate, for each action and while detecting the plurality of inputs, a plurality of prediction models, at least one of the plurality of prediction models including a trajectory and a probability of virtual collision of the portion of the at least one tracked input device with at least one of the plurality of volumetric zones;

determine, based on the plurality of prediction models, in which of the plurality of volumetric zones the portion of the at least one tracked input device is predicted to virtually collide; and for each action, match at least one prediction model from the plurality of prediction models to a tracked trajectory corresponding to a virtual contact between the portion of the at least one tracked input device and at least one of the plurality of volumetric zones, the tracked trajectory including at least a backswing and a downward arc, perform the respective action associated with the matched at least one prediction model; and provide output in a display in the head-mounted display device, the output including a textual character corresponding to the virtual contact in the at least one of the plurality of volumetric zones.

15. The system of claim 14, further comprising in response to determining a match does not exist between the at least one prediction model and the trajectory, suppressing performance of the action associated with the at least one prediction model.

16. The system of claim 14, further comprising suppressing performance of the action associated with the at least one prediction model based on determining that a velocity associated with the action is below a threshold velocity, wherein the threshold velocity is configured to detect a pressure associated with the action.

17. The system of claim 14, wherein determining which of the plurality of volumetric zones a portion of the at least one tracked input device contacts is based at least in part on the plurality of positions and orientations associated with the at least one tracked input device and a derived velocity associated with the at least one tracked input device.

18. The system of claim 14, wherein generating the plurality of prediction models includes processing the plurality of inputs that include, for each action, a heading, an angle, a course, and a derived velocity.

19. The system of claim 18, wherein the course comprises a trajectory and a contact zone corresponding to at least one of the plurality of volumetric zones.

20. The system of claim 18, wherein the plurality of actions are tracked in six degrees of freedom to determine a position and orientation associated with each action performed within the virtual environment.

* * * * *